Sept. 7, 1965  S. STEUERMAN  3,204,414

METHOD AND MEANS FOR COMPACTING SANDY MATERIALS

Filed Aug. 23, 1960

INVENTOR.
SERGEY STEUERMAN
BY
Leon M. Strauss
AGT.

3,204,414
METHOD AND MEANS FOR COMPACTING
SANDY MATERIALS
Sergey Steuerman, 375 Riverside Drive, New York, N.Y.
Filed Aug. 23, 1960, Ser. No. 51,394
3 Claims. (Cl. 61—36)

This invention relates to a method of compacting granular masses, in particular, earth, sandy soil and like stacked formations permeated with water and further to a vibrator for carrying out the aforesaid method.

It is one of the primary objects of the invention to provide a procedure for substantially uniformly densifying and fortifying through compaction steps sandy or the like stacked masses within a soil area to usefully transform the same for construction or like purposes.

It is another object of the invention to provide means affording a very efficient and speedy operation in compacting sandy soil below the surface, as well as below and above the ground water level of the soil to be treated.

Yet another object of the invention resides in the provision of means facilitating the manipulation of an explosion-releasing compactor device, which is safe to operate and move within a considerable depth of soil and like masses, which consist completely or at least partially of sandy strata, so that the same are uniformly densified and evenly distributed within a predetermined compacted soil area under treatment.

Still a further object of the invention is to provide means implementing a step-by-step compaction of loose granular masses under controlled conditions by the use of successive explosive charge detonations of predetermined direction and in a preselected pattern or path, which may be spiral or of a desired sequence to bring about a compacted area or section of substantially even extent.

A further object of the invention contemplates the creation of substantially uniform densified or compacted soil areas located adjacent and/or intersecting each other, so that such area formations may carry ultimately a relative heavy load and become useful for foundation and similar construction purposes.

The invention, therefore, proposes certain time- and power-controlled treatment phases or steps, which lead to a highly efficacious, rapid, simplified and economical earth compaction of predetermined degree.

These and other objects of the invention will become further apparent from the following detailed description, reference being made to the accompanying drawing, showing preferred embodiments of the invention.

Figures 2, 3, 4, 5:
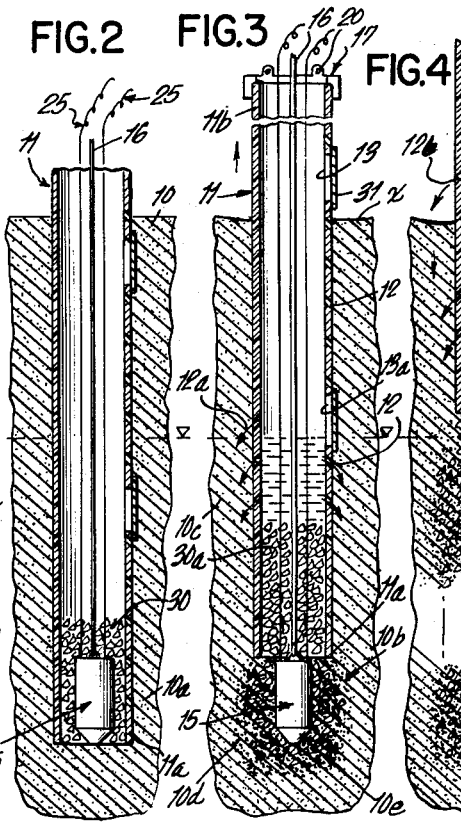
FIG. 2 is a view similar to that of FIG. 1 with a jolting or vibrator device constructed according to the invention and containing in the lowermost pipe part gravel or sand fill material.

FIG. 3 indicates a predetermined method step and position of the vibrator device and pipe shown in section and coupled to each other in preselected location of said device relative to the lowermost end of the pipe.

FIG. 4 illustrates a fragmentary and partial sectional view of said pipe and vibrator device in the course of operation during the performance of the compaction method.

FIG. 5 illustrates the completion of the operation of the pipe (partly in section) coupled with the vibrator device.

Figures 6, 10:
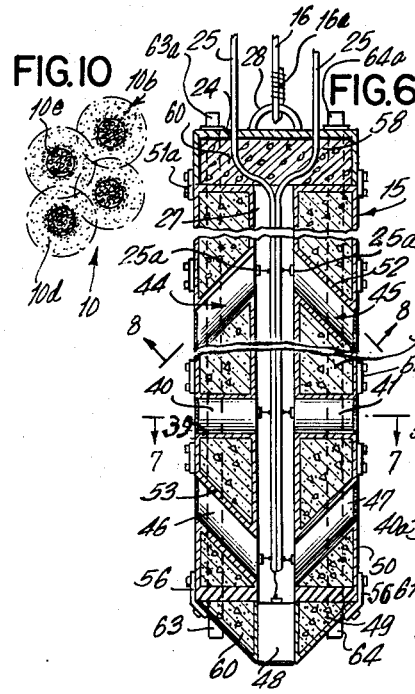

FIG. 6 is a longitudinal sectional view of the vibrator or compactor device according to the invention (parts being broken away), the device being loaded with detonation charges oriented in various directions.

Figure 7:
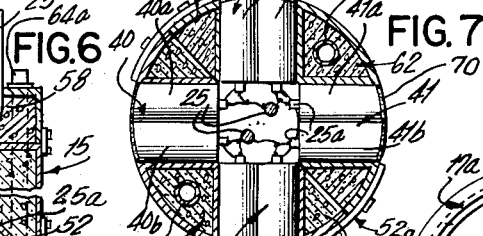

FIG. 7 is an enlarged sectional view of the device taken along line 7—7 of FIG. 6.

Figure 8:
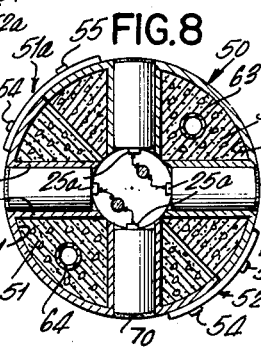

FIG. 8 is an enlarged sectional view of the device taken along line 8—8 of FIG. 6.

Figure 9:
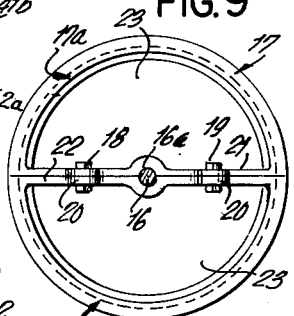

FIG. 9 is a top plan view of the device of FIG. 3, partly in section and illustrated on an enlarged scale.

FIG. 10 illustrates on a reduced scale a plan view of various compacted areas of soil, the compacted areas being shown to partly intersect each other.

Figure 1:
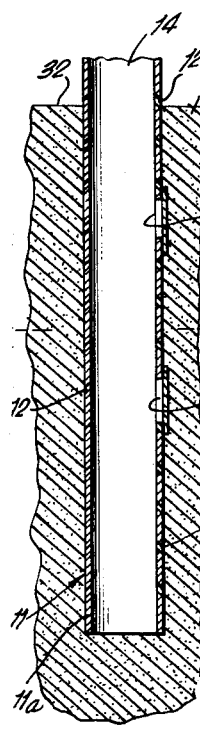
FIG. 1 is a schematic and sectional view of a pipe member employable in the invention and located in a sandy soil section to be compacted, the interior of said pipe being freed from soil material.

Referring now more particularly to the drawing, there is shown schematically in FIG. 1 a section of sandy soil area 10 into which is inserted in any known manner a tube of steel or other suitable material 11 which is cylindrical in cross section and has downwardly directed openings 12 at various levels and further closable windows 13, 13a, for a purpose later described.

In this instance, from the interior 14 of tube or pipe 11 any sandy soil has been previously removed by an suitable means such as water jets, through exhaust and the like. Tube 11 has a lower end 11a into which is inserted a heavy housing 15 of a special construction as will be set forth later on in detail. Housing 15 is suspended by means of a cable 16 from a top piece or holder 17 which is located on the uppermost end 11b of pipe 11 (FIGS. 3 and 9). Top piece 17 consists of two semi-cylindrical parts 17a, 17b which are connected to each other by means of screws 18, 19 passing through eyes 20 of flanges 21, 22.

Through the hollow space or access openings 23 of top piece 17 pass further electrical lines or cables 25 for a purpose later described.

These cables 25 pass finally through suitably sealed openings 24 into the hollow interior 27 of the confining wall 50 of the housing 15, as more clearly seen in FIGS. 6 and 7. Cable 16 is anchored on the housing 15 by a wire wrap connection 16a where the end of the cable 16 is looped through an eye 28. As can be further seen from FIG. 2, after housing 15 has been lowered in tube or pipe 11 gravel or any sand material 30 is supplied through openings 23, whereupon the lower end 11a of tube 11 is raised and thus withdrawn a predetermined distance from the interior of sandy soil area 10a to be treated. The housing 15, however, remains within the sandy soil area 10a, whereas the lowermost end 11a of pipe 11 is lifted to the extent of about a little more than the total height of the confining wall 50 of the elongated housing 15.

Window 13 provided in pipe 11 serves (when open) to permit further gravel supply 30a, whereupon window 13 is then closed by a cover 31 located on the outer surface of pipe 11 or set in the latter in any appropriate manner.

In the present instance, tube or pipe 11 was lowered through the top surface 32 of the soil 10 in which a ground water level 33 is indicated in FIGS. 1 through 5. As the ground water will immediately fill the lower pipe end 11a and also a certain upper part of the pipe 11, as indicated in FIG. 3, only when pipe 11 has been moved further above said ground water level 33 (FIG. 4) will it become necessary to supply water or any other suitable liquid through a supply hose 65 leading into the upper open end of pipe 11.

Gravel layers 30a will be permeated by the ground water and the neighboring sandy soil areas 10c will also be moistened by water seeping through downwardly inclined holes 12 of pipe 11 in accordance with the arrows 12a. In the position of the housing 15 as shown in FIG. 3, the upper end of cable 16 is clamped between the aforesaid top pieces 17a, 17b at 16a, so that the housing 15 together with pipe 11 forms then a unitary operational means for treating the sandy soil.

Explosive charges are mounted in and carried by the housing 15, which charges may be brought to detonation and explosion through an electric circuit and switch mechanism (not shown) and preferably located remote from the site, where the housing is disposed.

As can be seen from FIGS. 6 to 8, inclusive, explosion charges 40 and 41, 42 and 43 consist each of two cartridges 40a, 40b, 41a, 41b, 42a, 42b and 43a, 43b. Cables 25 are appropriately connected to the charges which terminate in respective contacts 25a.

These charges 40, 41, 42 and 43 are oriented substantially in horizontal direction in casings 39, whereas other charges 44, 45 are located to extend in downwardly inclined casings 52, while charges 46 and 47 are located to assume an upwardly inclined or diverging position in casings 53. An empty casing 48 is shown at the lowermost end 49 of the confining wall 50 which encloses the housing 15.

This empty casing may be loaded with double charges similar to charges 40, 41 containing two cartridges or with only a single cartridge, as in the case of charges 44, 45.

Confining wall 50 consists of two semi-cylindrical parts 51, 52 which, in this instance, are held together by means of hoop or clamp plates 51a, 52a secured to the outer walls portions of confining wall 50 by fastening means 54, 55. An arcuately shaped hoop 56 is disposed and fixed in position by bolts adjacent the lower end 49 of confining wall 50.

Compartments 57, 58 of the confining wall 50 in which no cartridge charges are located, are filled with reinforced concrete 60 to provide a suitable weight for the housing 15. Through some of the concrete-filled compartments, such as 61, 62 (FIGS. 7 and 8), there extend lengthwise of the housing and in downward direction tubular means 63, 64, whose upper ends 63a, 64a (FIG. 6) may be connected to respective hose means (not shown) to facilitate jetting of water or other liquid from the soil surface into the soil or stacked granular mass, which liquid is discharged through the lowermost ends or nozzles of tubular means 63, 64, when the housing 15 is to be inserted into said soil by means of pipe or conduit 11, previously coupled to housing 15 in a manner set forth above (FIG. 9).

The aforesaid tubular means 63, 64 may, however, in some instances be employed to wash out any soil within said conduit 11 during the insertion of same into the soil.

It is further contemplated by this invention to take advantage of some of the battery of explosive charges, e.g. 46, 47 to introduce said housing 15 together with conduit 11 into the soil within the shortest time possible, thereby considerably enhancing the versatility and economical operation of the housing according to the invention.

It is to be noted that the battery of explosive carrying cartridges (about 95, i.e. about one cartridge containing 1 to 2 dynamite sticks for each foot of soil depth to be compacted) are well sealed in their respective casings against penetration of moisture or other undesirable foreign matter by paraffin or like sealers 70 capable of avoiding any undesirable establishment of electrical connection under water.

It is well known in the art, that the use of constantly acting vibrators of large diameters driven by an electrical motor or hydraulically or by compressed air leads to expensive auxiliary equipment on the site, whereby the compaction cost is considerably increased, whereas the depth of application of desirable vibrations for soil compaction is markedly limited.

The use of explosive blasts for compaction of granular soils and fills therefor produces vibrations which may result in compactions of a non-uniform nature throughout the area to be compacted.

This was due to the fact that vibrations produce optimum compaction in granular soils which are either completely dry or completely imbued with water or any other suitable fluid. If the granular material is only wet, the compaction achieved by vibrations is of doubtful nature due to the high capillary forces acting on the surface of the fine grains (of sand). When the granular material is compacted its void volume diminishes and some part of air and water contained in the pores or voids must escape. Escape of air may be a problem in very fine granular materials only, but can only occur in water imbued soil during compaction, when water has a possibility to escape during the course of compaction operation.

In uniform soil such excess water or liquid has a tendency to move upwards towards the soil surface and may loosen up the soil and even produce quicksand conditions in it.

The present invention employs the reaction forces stemming from detonations or blasts of explosives mounted on a deep seated housing to produce intermittent shocks and vibrations within the stratum of granular material, the strength of each blast being predetermined and the time interval from blast to blast and the vertical distance from blast to blast may be readily regulated during the compaction method by electric circuit means and switches of simple nature. At the same time an easy escape of porewater or excess water from the compacted area, as well as passages for water or any other liquid are established during the compaction process. Thus the pipe 11 constitutes an escape path for the water.

When the housing 15 with the explosives mounted thereon is introduced into the soil to a required depth, one or many shots or blasts may be released jolting the housing 15 and the surrounding soil area. During this blasting operation or immediately thereafter, the housing may then be retracted to the next upper stratum and the blasting operation is repeated. The height of each step of retraction and the time interval between two subsequent blasts may be easily determined by measurements of actual soil conditions.

In order to observe the desired properties of the material during the course of compaction the pipe 11 with weep holes 12 permits the rise of the fluid or liquid to such level that water is still able to seep through certain of the weep holes.

By this observation it is possible to reach a conclusion as to the effect of vibration exerted by the vibrating housing upon the material under treatment. If the first blast occurs and the water level does insignificantly rise, then the next blast may be carried out after pipe 11 has been lifted together with housing 15 for about one foot, which will bring about a higher level of water in the pipe 11 until such level is observed above the surface 32 of the soil.

As soon as water flows out through weep holes 12b above the surface 32 (see arrows in FIG. 4), this is an indicator that no further blasts or jolting movements of the housing are permissible. After the water level has receded and pipe 11 with housing 15 have been further withdrawn from the compacted soil region 10d, 10e for about one foot, a new blast of preselected cartridge or cartridges may be effectuated.

The property observation of the soil can be further carried out by watching the amount or degree of settlement or sinking of the soil surface 32. After each blast some settlement or sinking in of the soil surface will ensue and during the entire compaction a greater or lesser settlement of the surface 32 at $x$, $y$ or $z$ takes place. If this settlement is considerable, it indicates that the compaction of the soil below the surface has become thoroughly effective.

The soil settlemnet during this compaction method may amount to approximately one inch per foot. As above stated, pipe 11 with its upper weep holes 12b will serve as an observation pipe and also as a guide for housing 15. Therefore, if no water is discharged from the upper weep holes 12b, this indicates compaction is not yet completed. As long as water is passing through these upper weep holes, the time interval for a further blast must be prolonged.

Consequently, if after the first blast (explosion) the water level is not sufficiently raised to pass the observation weep holes 12b, a second blast or even a third blast may follow until water flows out again through the weep holes above the soil or ground surface 32. While the above mentioned degree of settlement of the soil surface indicates the degree of compaction, the upward movement of the water in pipe 11 determines the length or interval of time between subsequent detonations or blasts.

The operation of the process of the invention may be carried out by means of powerful explosive charges by the housing which may be constructed with a relative small outside diameter. The same is introduced into the soil by first sinking or inserting the bore pipe 11 into the soil to the required depth, said pipe having an inner diameter larger than the outer diameter of the housing. Before the insertion of the housing 15, washing out of the interior of the pipe from any soil present is performed.

After the housing 15 is located in the pipe 11, the lowermost end of the latter is then withdrawn a definite distance (FIG. 3), leaving the housing outside of said pipe. After the housing is introduced a part of the surrounding shaft formed by the retracted pipe end 11a is then filled with granular material having a high permeability coefficient. In some cases gravel or gravel-sand may be used as a fill material 30.

Thus, water pressed out from the compacted material of the respective stratum under treatment will find an easy escape or passage through such fill material (filter) of such nature adapted to prevent forming of quicksand condition.

The housing and the casing, when connected together above the ground surface, may be operated as a unit. A retraction of the unit 11–15–16 is specially easy during or immediately after each blast, since the blast vibrations reduce temporarily the friction between the housing wall 50 and the surrounding soil. In addition, by the inclined positioning and the preselected direction of the charge blasts a further upwardly oriented force can be obtained by each blast.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A method of compacting soil, which comprises suspending a heavy housing, which has mounted thereon a plurality of explosive charges, from above the surface and positioning the housing at a predetermined first level within granular soil permeated with water, providing an escape path for said water from a location substantially above said housing upwardly through said soil to the surface thereof, detonating one of said explosive charges with the explosive force directed in a substantially horizontal direction to cause said housing to vibrate, thereafter raising the housing to a predetermined second level above the first level, and detonating a second one of said explosive charges.

2. The method of compacting sandy earth mass within the soil; comprising the steps of introducing a pipe substantially vertically into said soil, removing soil from the interior of said pipe, thereby forming a vertical shaft with a wall of soil around said pipe, thereafter suspending from a cable and within said pipe near the lowermost end thereof a heavy housing having mounted thereon a plurality of explosive charges, then lifting the lowermost end of said pipe to a location above said housing, then detonating at least one of said explosive charges with the explosive force directed in a substantially horizontal direction, thereafter effectuating stepwise withdrawal of the pipe and of said housing from said vertical shaft, delivering fill material through said pipe for location thereof above and below said housing, and intermittently detonating some of said explosive charges in predetermined sequence and directions during said stepwise withdrawal, so that reaction forces emanating from said detonations are applied to the wall of said shaft and orientation of at least a part of said fill material is effectuated toward said shaft, thereby to tamp the wall of said shaft for compacting purposes.

3. The method of compacting and solidifying sand, earth and like granular masses permeated with water; comprising the steps of substantially vertically introducing pipe means through the surface of an earth mass thereinto, then evacuating from the interior of said pipe means earth mass enclosed therein, thereafter suspending within said evacuated pipe means a heavy housing having mounted thereon a plurality of explosive charges, withdrawing the lowermost end of said pipe means a predetermined distance in upward direction, positioning said housing below said lowermost end of said pipe means, coupling said housing in said position to said pipe means, so that upon stepwise withdrawal of said pipe means from said earth mass a shaft corresponding to the outer diameter of said pipe means is obtained, collecting water from the earth mass in said pipe means to a predetermined level, delivering fill material through said pipe means for location above and below said housing, detonating at least one of said explosive charges, raising said pipe means with the housing coupled thereto upwardly towards the surface and intermittently detonating some of said explosive charges of said housing at the raised position in predetermined sequence with the explosive force directed in a substantially horizontal direction, so that vibratory reaction forces emanating from said charges are applied via said housing to the earth mass in said shaft for tamping said earth mass and said fill material.

References Cited by the Examiner

UNITED STATES PATENTS

| | | | |
|---|---|---|---|
| 940,100 | 11/09 | Welsh | 61—53.64 |
| 1,355,066 | 10/20 | Smith | 61—11 |
| 1,461,451 | 7/23 | Powell | 61—53.54 |
| 1,598,300 | 8/26 | Moran | 61—35 |
| 2,169,724 | 8/39 | Edelhoff | 61—35 |
| 2,235,695 | 3/41 | Ackley | 61—36 |
| 2,236,759 | 4/41 | Lyman | 61—35 |
| 2,334,228 | 11/43 | Steuerman | 61—35 |
| 2,412,398 | 12/46 | Harsch | 61—63 |
| 2,885,861 | 5/59 | Jackson | 61—63 |

FOREIGN PATENTS 681 1/13 Britain.

EARL J. WITMER, *Primary Examiner.*

JACOB L. NACKENOFF, WILLIAM I. MUSHAKE, *Examiners.*